United States Patent
Barak et al.

(10) Patent No.: US 9,867,505 B2
(45) Date of Patent: Jan. 16, 2018

(54) QUICK TACKING ICE-CREAM SCOOP APPARATUS

(71) Applicants: Dovber Barak, Kiryat Malachi (IL); Geula Barak, Kiryat Malachi (IL)

(72) Inventors: Dovber Barak, Kiryat Malachi (IL); Geula Barak, Kiryat Malachi (IL)

(*) Notice: Subject to any disclaimer, the term of this patent is extended or adjusted under 35 U.S.C. 154(b) by 0 days.

(21) Appl. No.: 15/132,266

(22) Filed: Apr. 19, 2016

(65) Prior Publication Data

US 2016/0316783 A1    Nov. 3, 2016

(30) Foreign Application Priority Data

May 3, 2015 (IL) .......................................... 238596

(51) Int. Cl.
*A23G 9/28* (2006.01)
*A47J 43/28* (2006.01)

(52) U.S. Cl.
CPC .................... *A47J 43/282* (2013.01)

(58) Field of Classification Search
CPC .................. A47J 43/282; A23G 9/28
USPC ......................... 425/276, 279, 282
See application file for complete search history.

(56) References Cited

U.S. PATENT DOCUMENTS

| | | | | |
|---|---|---|---|---|
| 1,947,828 A | * | 2/1934 | Codney | H01C 10/38 338/182 |
| 2,859,325 A | * | 11/1958 | Lea | A47J 43/282 219/227 |
| 3,513,290 A | * | 5/1970 | Burley | A47J 43/282 219/227 |
| 3,799,407 A | * | 3/1974 | Loethen | A47J 43/282 222/333 |
| 8,591,214 B2 | | 11/2013 | Moore | |

* cited by examiner

*Primary Examiner* — Timothy Kennedy
(74) *Attorney, Agent, or Firm* — Daniel J. Swirsky; AlphaPatent Associates Ltd.

(57) ABSTRACT

A quick-tacking ice-cream scoop apparatus, including a heating element, for heating a scoop of the apparatus, for accompanying insertion of the scoop into ice-cream, and a mechanism for operating the heating upon pressing the scoop on the ice-cream.

8 Claims, 5 Drawing Sheets

QUICK TACKING ICE-CREAM SCOOP APPARATUS

CROSS-REFERENCE TO RELATED APPLICATIONS

This application claims the benefit of priority from Israel Patent Application No. 238,596 filed May 3, 2015, the disclosure of which is incorporated herein by reference.

TECHNICAL FIELD

The invention relates to the field of quick heat ice-cream scoops.

BACKGROUND

U.S. Pat. No. 8,591,214 to Moore discloses a quick-tacking ice-cream scoop apparatus being an improved heat ice-cream scoop that includes a ceramic heating element and an ergonomic grip. The ceramic heating element is built into the ice-cream scoop and quickly heats up the ice-cream scoop, and conversely shall quickly cool down when turned off. The ice-cream scoop is mounted to an ergonomic grip that reduces hand fatigue of the end user while providing a location to store powering means for powering the ceramic heating element. The heating unit is an on/off button that is accessible from a top surface of the handle.

However, the heating is not changeable, and thus the heating level is not a function of the character of the ice-cream.

In one aspect of the invention, the invention provides a method and apparatus for heating the ice-cream scoop as a function of the character of the ice-cream In one aspect of the invention, the invention provides a solution to the above-mentioned and other problems of the prior art.

Other aspects of the invention will become apparent as the description proceeds.

SUMMARY

In one aspect, the invention is directed to a quick-tacking ice-cream scoop apparatus, comprising:
  a heating element, for heating a scoop of the apparatus, for accompanying insertion of the scoop into ice-cream; and
  a mechanism for operating the heating upon pressing the scoop on the ice-cream.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of preferred embodiments of the invention, which are meant to be descriptive and not limiting. For the sake of brevity, some well-known features, methods, systems, procedures, components, circuits, and so on, are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
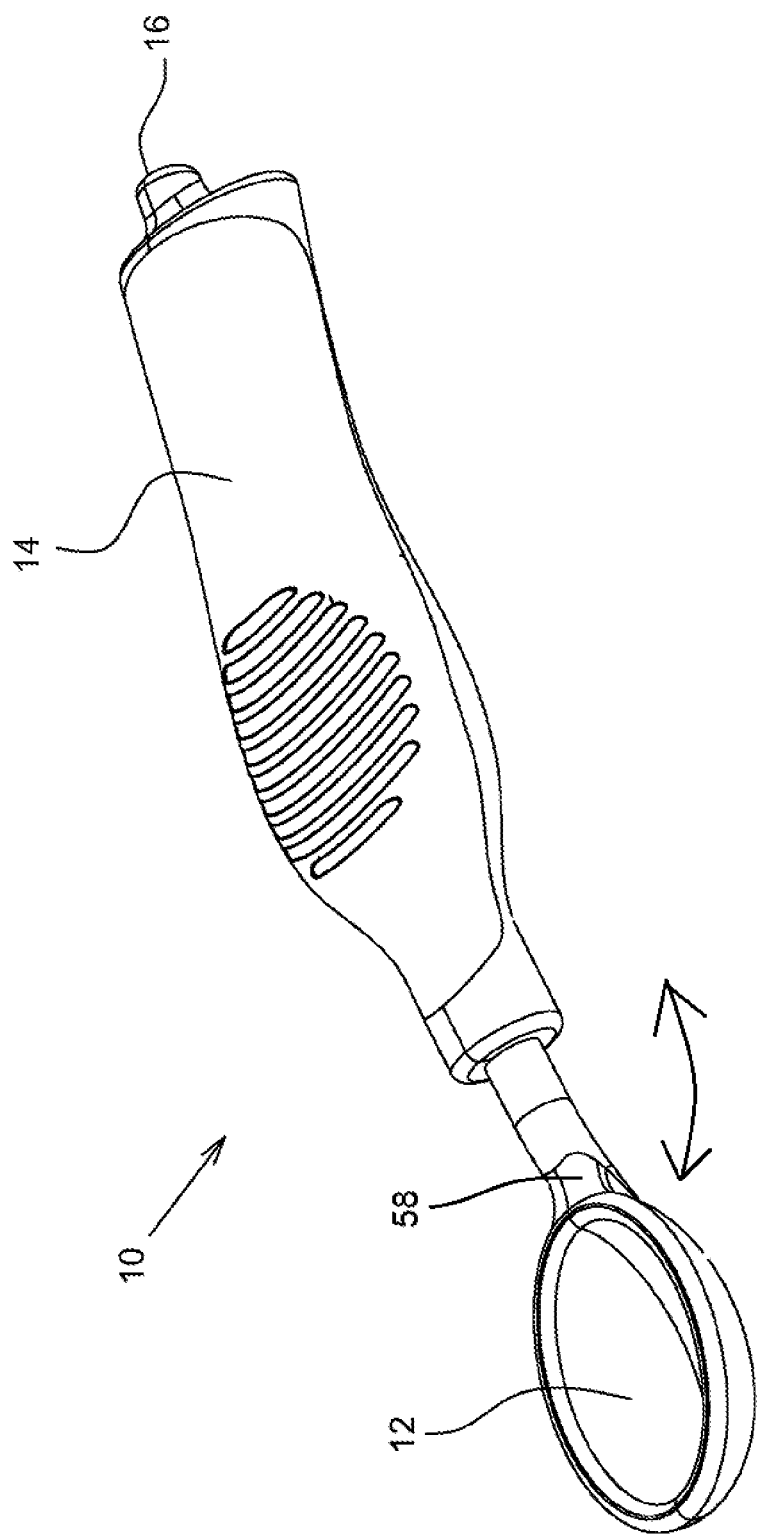
FIG. 1 is a perspective view of a quick-tacking ice-cream scoop apparatus, according to one embodiment of the invention.

FIG. 1 is a perspective view of a quick-tacking ice-cream scoop apparatus, according to one embodiment of the invention.

A quick-tacking ice-cream scoop apparatus 10, according to the invention, allows slight rotation 62 of the scoop 12 in relation to the handle 14. Scoop 12 is fixed to a rod 58, extending into handle 14, thus rod 58 as well is rotatable in relation to handle 14.

Figure 2:
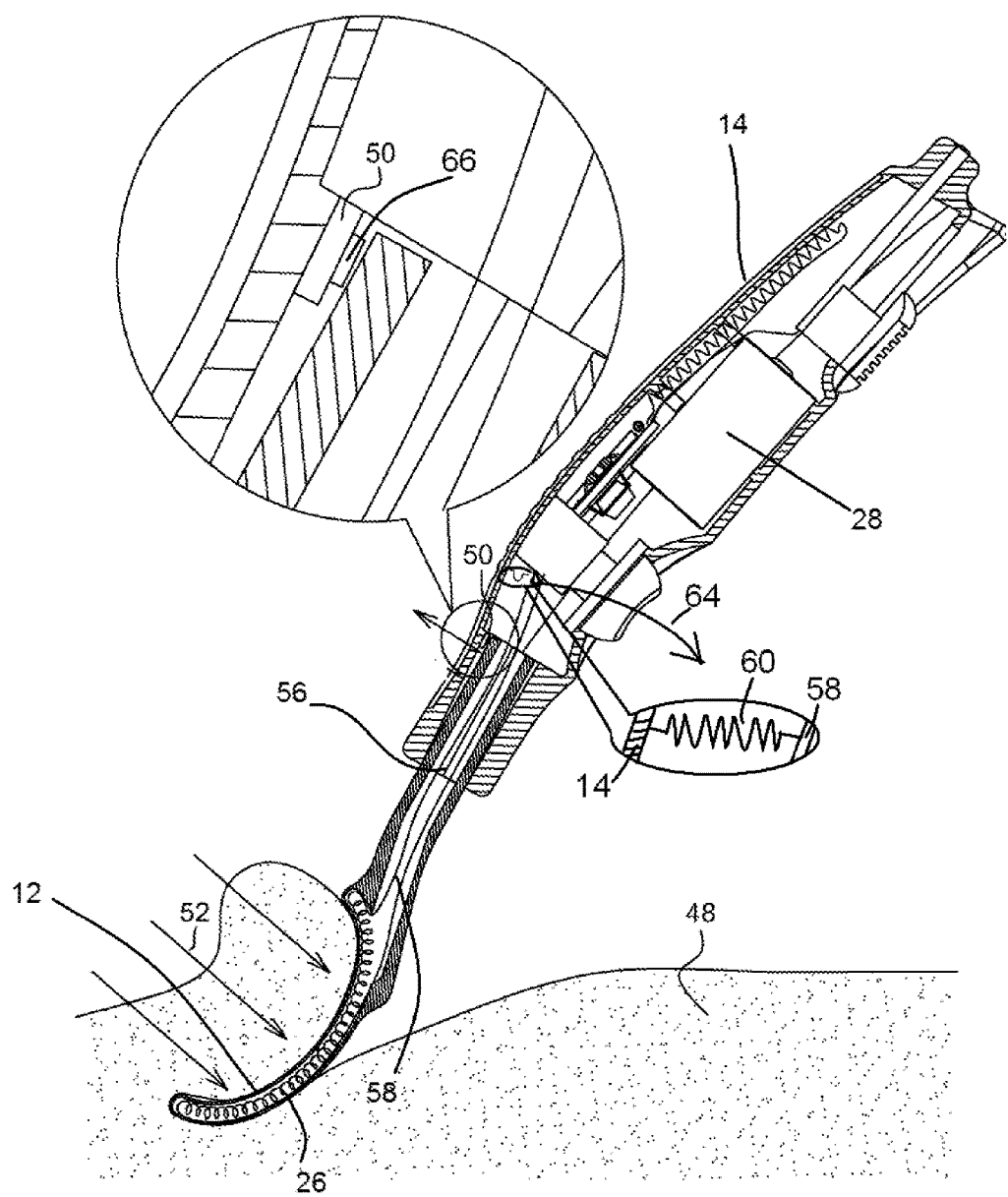
FIG. 2 is a side sectional view of the quick-tacking ice-cream scoop apparatus of FIG. 1.

FIG. 2 is a side sectional view of the quick-tacking ice-cream scoop apparatus of FIG. 1.

Rod 58 is rotatable in relation to handle 14 about a hinge 56. Upon inserting scoop 12 into ice-cream 48, ice-cream 48 presses scoop 12 and rod 58 along direction 52, against a spring 58.

The pressure applied on rod 58 presses a pressing surface 66 of a switch 50. Switch 50 turns on a heating element 26, disposed within scoop 12.

Thus, switch 50 and additional elements constitute a mechanism 64, for operating heating element 26, upon applying pressure on scoop 12 by handle 14.

Upon releasing the pressure on handle 14, spring 58 rotates rod 58 back, for ceasing the pressure of rod 58 on switch 50, for turning heating element 26 to off.

Figure 3:
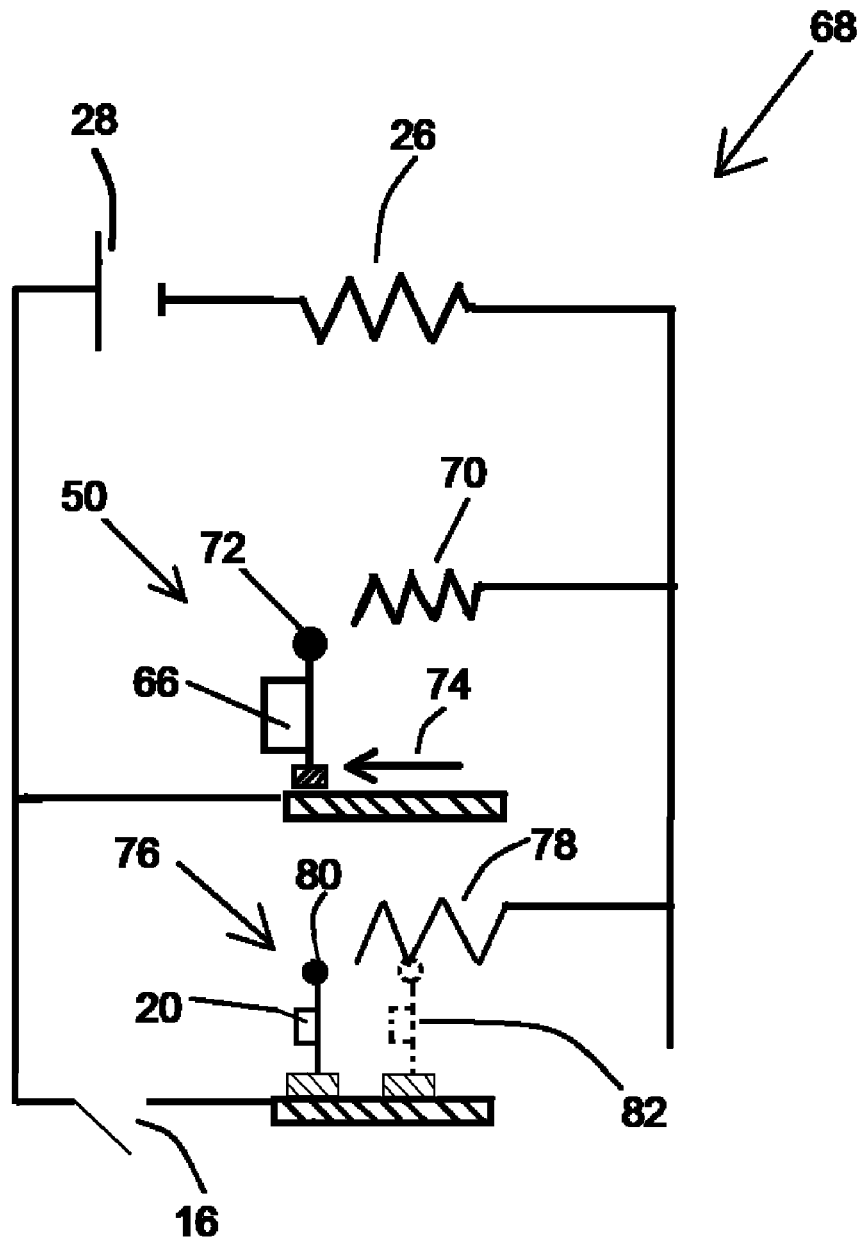
FIG. 3 is the electric circuit within the quick-tacking ice-cream scoop apparatus of FIG. 1.

FIG. 3 is the electric circuit within the quick-tacking ice-cream scoop apparatus of FIG. 1.

Circuit 68 includes a rechargeable battery 28, for supplying power to heating element 26, through switch 50.

Switch 50, except for closing and opening circuit 68, may further include a variable resistor 70, for variably supplying the power of rechargeable battery 28 after closing circuit 68.

Spring 60 of FIG. 2 presses the movable connector 72 to the direction of arrow 74, for normally opening circuit 68. The stiffest ice-cream 48 is, the stronger is the pressure applied on surface 66; the stronger pressing surface 66 is pressed, the smaller is the effective resistance of variable resistor 70; the smaller is the effective resistance of variable resistor 70, the stronger is the heating of heater 26.

In summary, the stiffest ice-cream 48 is, the stronger is the heating of heater 26.

Rechargeable battery 28 may supply the power to heating element 26, further through a springy manual switch 76, connected in parallel to switch 50, for increasing the current flowing through heating element 26.

Manual springy switch 76, as well may further include a variable resistor 78, for variably supplying the power of rechargeable battery 28 once being pressed.

Manual springy switch 76 may include a lock, for disposing the movable connector 72 thereof to a certain disposition 82 within variable resistor 78, for supplying a pre-determined extent of heating.

Figure 4:
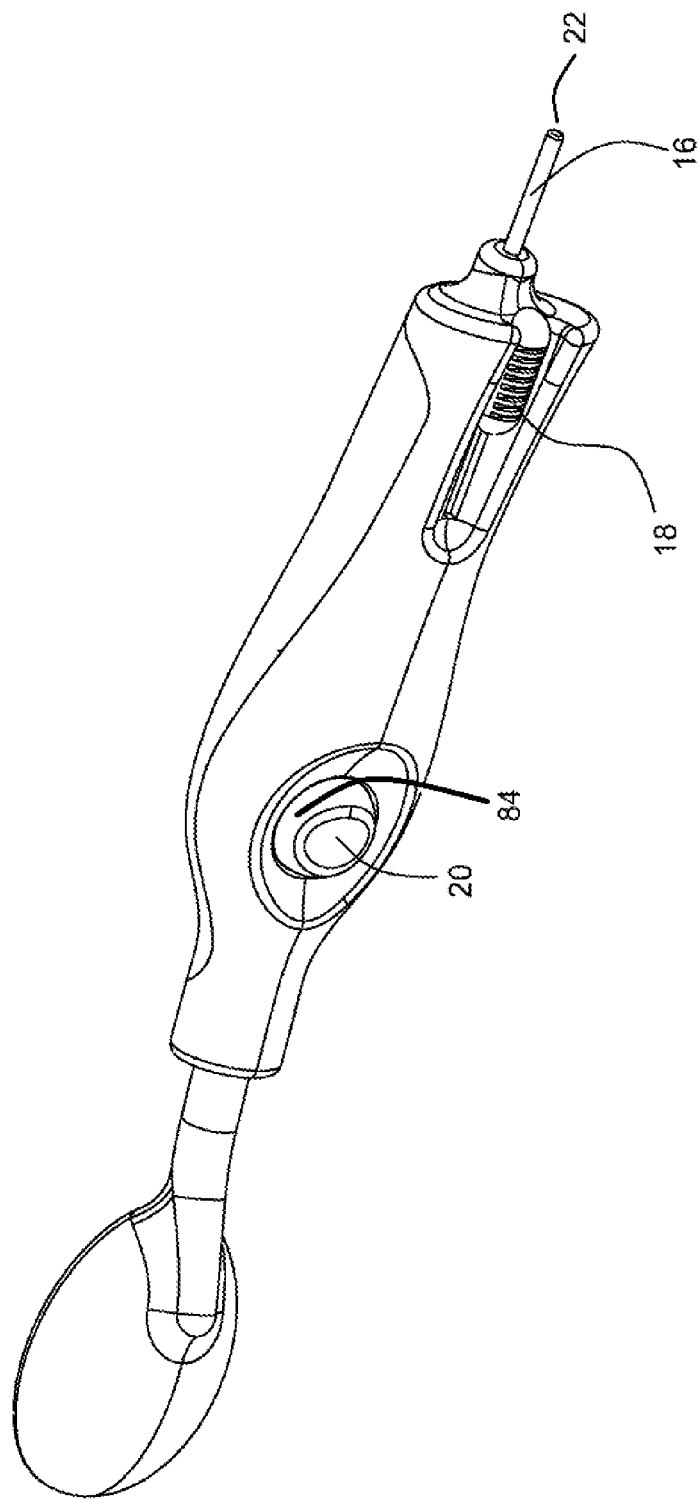
FIG. 4 is a perspective view of the quick-tacking ice-cream scoop apparatus of FIG. 1 from the opposite side.

FIG. 4 is a perspective view of the quick-tacking ice-cream scoop apparatus of FIG. 1 from the opposite side.

Manual springy switch 76 is manually pressed by pressing an external surface 20. Manual springy switch 76 may be manually locked by manually pressing a lock 84.

Quick-tacking ice-cream scoop apparatus 10 may include a thermometer 16, being extendable by an extension button 18, to the rear end, i.e. opposite to scoop 12. According to one embodiment, thermometer 16 may function as a thermostat, for turning heating element 26 to off, upon inserting end 22 of thermostat 16 into the ice-cream.

Referring again to FIG. 3, according to this embodiment, thermostat 16 may be connected in serial to manual switch 76, for not supplying current to heating element 26, even if manual switch 76 is locked to disposition 82.

Figure 5:
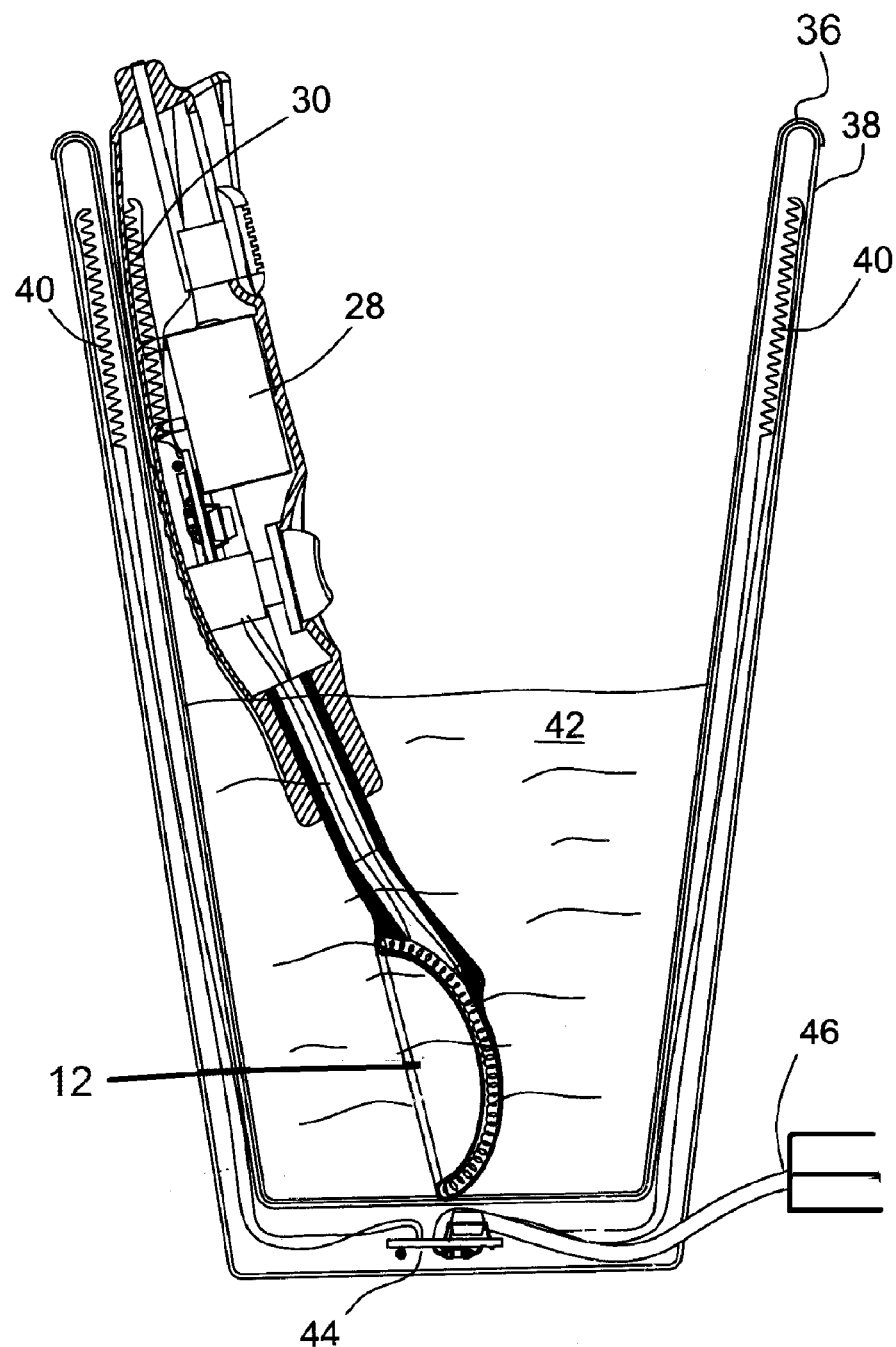
FIG. 5 is a sectional view of the quick-tacking ice-cream scoop apparatus of FIG. 1 while being cleaned.

FIG. 5 is a sectional view of the quick-tacking ice-cream scoop apparatus of FIG. 1 while being cleaned.

While cleaning scoop 12 in water 42 contained in a cup 36, cup 36 may be inserted into a battery charging accessory 38, shaped like cup 36. Battery charging accessory 38 may include a power supply plug 46, a power converter 44, and a coil 40, for charging battery 28 of quick-tacking ice-cream scoop apparatus 10 by induction through a coil 30 of quick-tacking ice-cream scoop apparatus 10.

Thus, the invention is directed to a quick-tacking ice-cream scoop apparatus (10), comprising:
  a heating element (26), for heating a scoop (12) of the apparatus (10), for accompanying insertion of the scoop (12) into ice-cream (48); and
  a mechanism (64) for operating the heating upon pressing the scoop (12) on the ice-cream (48).

The mechanism (64) may include:
  a variable resistor (70), for heating the scoop (12) in an extent corresponding to an extent of the pressing of the scoop (12) on the ice-cream (48).

The mechanism (64) may further include:
  a spring (60), for applying force thereon by the pressing of the scoop (12) on the ice-cream (48), the spring for varying the variable resistor (70).

The spring (60) is further for ceasing the heating upon ceasing pressing the scoop (12) on the ice-cream (48).

The mechanism (64) may include a first switch (50), for supplying electric current to the heating element (26), upon pressing the scoop (12) on the ice-cream (48), and for ceasing the supplying otherwise.

The quick-tacking ice-cream scoop apparatus (10) may further include:
  a manual switch (76), for supplying electric current to the heating element (26), upon pressing the manual switch (76).

In another aspect, the quick-tacking ice-cream scoop apparatus (10) may further include:
  a manual switch (76), for supplying electric current to the heating element (26), upon pressing the manual switch (76); and
  a second variable resistor (78), for heating the scoop (12) in an extent corresponding to an extent of the pressing of the manual switch (76).

The quick-tacking ice-cream scoop apparatus (10) may further include:
  a manual lock (84), for locking the second variable resistor (78) in a manually selected value, thereby allowing pre-selected additional heating to the heating supplied through the second variable resistor (70).

In another aspect, the quick-tacking ice-cream scoop apparatus (10) may further include:
  a manual switch (76), for supplying electric current to the heating element (26), upon pressing the manual switch (76).
  a second variable resistor (78), for heating the scoop (12) in an extent corresponding to an extent of the pressing of the manual switch (76), the second variable resistor (78) connected in parallel to the first variable resistor (70).

The quick-tacking ice-cream scoop apparatus (10) may further include:
  a thermostat (16) disposed at an end of a handle (14) opposing the scoop (12), the thermostat (16) for turning the heating element (26) to off upon inserting the thermostat (16) into the ice-cream (12), while not using the scoop (12).

In another aspect, the invention is directed to a quick-tacking ice-cream scoop apparatus (10), comprising:
  a heating element (26), for heating a scoop (12) of the apparatus (10), for accompanying insertion of the scoop (12) into ice-cream (48); and
  a variable resistor (70,78) for selecting a level of the heating.

In the figures and/or description herein, the following reference numerals (Reference Signs List) have been mentioned:
  numeral 10 denotes a quick-tacking ice-cream scoop apparatus 10, according to one embodiment of the invention;
  numeral 12 denotes the scoop of the quick-tacking ice-cream scoop apparatus;
  numeral 14 denotes the handle of the quick-tacking ice-cream scoop apparatus;
  numeral 16 denotes a thermometer, which may function as a thermostat;
  numeral 18 denotes a button for extending the thermometer;
  numeral 20 denotes a surface for pressing the manual switch;
  numeral 22 denotes the end of the thermostat;
  numeral 26 denotes the heating element;
  numeral 28 denotes a rechargeable battery;
  numeral 30 denotes a coil of the quick-tacking ice-cream scoop apparatus, for charging the battery via electric induction;
  numeral 36 denotes a cup for cleaning the ice-cream scoop;
  numeral 38 denotes a battery charging accessory;
  numeral 40 denotes a coil of the battery charging accessory;
  numeral 42 denotes water;
  numeral 44 denotes a power converter;
  numeral 46 denotes a plug;
  numeral 48 denotes ice-cream;
  numeral 50 denotes a switch, which is not directly operable by a user, but rather is operated upon pressing on the scoop in relation to the handle;
  numeral 52 denotes a direction;
  numeral 56 denotes a hinge;
  numeral 58 denotes a rod;
  numeral 60 denotes a spring;
  numeral 62 indicates rotation of the scoop;
  numeral 64 denotes the mechanism for operating the heating element upon applying pressure on the scoop;

numeral 66 denotes the pressing surface of switch 50, which is not directly operable by a user, but rather is operated upon pressing on the scoop in relation to the handle;

numeral 68 denotes an electric circuit;

numeral 70 denotes a variable resistor, accompanied to switch 50;

numeral 72 denotes the movable connector of the variable resistor;

numeral 74 indicates a direction;

numeral 76 denotes a manual switch, for heating the scoop upon manual pressing of the switch;

numeral 78 denotes a variable resistor, accompanied to switch 76;

numeral 82 denotes a certain disposition of the movable connector within the variable resistor; and numeral 84 denotes a lock, for selecting a certain resistance for the variable resistor, for selecting a certain heating extent.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A quick-tacking ice-cream scoop apparatus, comprising:
   a heating element, for heating said scoop of said apparatus, for accompanying insertion of said scoop into ice-cream;
   a mechanism for operating said heating upon pressing said scoop on the ice-cream, wherein said mechanism comprises a first variable resistor, for heating said scoop in an extent corresponding to an extent of said pressing of said scoop on the ice-cream;
   a manual switch, for supplying electric current to said heating element, upon pressing said manual switch; and
   a second variable resistor, for heating said scoop in an extent corresponding to an extent of said pressing of said manual switch, said second variable resistor connected in parallel to said first variable resistor.

2. A quick-tacking ice-cream scoop apparatus according to claim 1, wherein said mechanism further comprises:
   a spring, for determining said extent corresponding to said extent of said pressing of said scoop on the ice-cream, thereby varying said first variable resistor.

3. A quick-tacking ice-cream scoop apparatus according to claim 1, wherein said mechanism comprises a spring, for ceasing said heating upon ceasing pressing said scoop on the ice-cream.

4. A quick-tacking ice-cream scoop apparatus according to claim 1, wherein said mechanism comprises a first switch, for supplying electric current to said heating element, upon pressing said scoop on the ice-cream, and for ceasing said supplying otherwise.

5. A quick-tacking ice-cream scoop apparatus according to claim 1, further includes:
   a manual switch, for supplying electric current to said heating element, upon pressing said manual switch.

6. A quick-tacking ice-cream scoop apparatus according to claim 1, further includes:
   a manual switch, for supplying electric current to said heating element, upon pressing said manual switch; and
   a second variable resistor, for heating said scoop in an extent corresponding to an extent of said pressing of said manual switch.

7. A quick-tacking ice-cream scoop apparatus according to claim 6, further includes:
   a manual lock, for locking said second variable resistor in a manually selected value, thereby allowing pre-selected additional heating to said heating supplied through said second variable resistor.

8. A quick-tacking ice-cream scoop apparatus according to claim 1, further includes:
   a thermostat disposed at an end of a handle opposing said scoop, said thermostat for turning said heating element to off upon inserting said thermostat into the ice-cream, while not using said scoop.

\* \* \* \* \*